(12) United States Patent
Abe et al.

(10) Patent No.: US 10,378,492 B2
(45) Date of Patent: Aug. 13, 2019

(54) AIR-CLEANER STRUCTURE OF SADDLE-RIDE TYPE VEHICLE

(71) Applicant: HONDA MOTOR CO., LTD., Tokyo (JP)

(72) Inventors: Ryuichi Abe, Wako (JP); Naoto Yamagishi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 67 days.

(21) Appl. No.: 15/428,825

(22) Filed: Feb. 9, 2017

(65) Prior Publication Data

US 2017/0254300 A1 Sep. 7, 2017

(30) Foreign Application Priority Data

Mar. 3, 2016 (JP) .................................. 2016-040858

(51) Int. Cl.
*F02M 35/024* (2006.01)
*B62J 35/00* (2006.01)
(Continued)

(52) U.S. Cl.
CPC ........ *F02M 35/02491* (2013.01); *B62J 17/02* (2013.01); *B62J 35/00* (2013.01);
(Continued)

(58) Field of Classification Search
CPC ............ B62J 2099/002; B62J 2300/002; B62J 35/00; B62J 99/00; B62J 17/02; B62J 2017/086; B62K 11/04; B62K 11/14; B62K 11/02; B62K 19/02; B62K 19/30; B62K 19/34; B62K 2202/00; B62M 7/06; F02M 35/02; F02M 35/02491; F02M 35/048;
(Continued)

(56) References Cited

U.S. PATENT DOCUMENTS

| 2009/0090090 A1 | 4/2009 | Nishizawa et al. |
| 2015/0034405 A1* | 2/2015 | Abe ....................... B62K 19/48 180/219 |

FOREIGN PATENT DOCUMENTS

| EP | 3205565 A1 | 8/2017 |
| JP | 2004-224311 | 8/2004 |

(Continued)

OTHER PUBLICATIONS

European Search Report dated Jul. 25, 2017, 7 pages.
(Continued)

*Primary Examiner* — Grant Moubry
*Assistant Examiner* — Ruben Picon-Feliciano
(74) *Attorney, Agent, or Firm* — Rankin, Hill & Clark LLP

(57) ABSTRACT

An air-cleaner structure of a saddle-ride vehicle is provided with an air-cleaner case arranged between a seat and a head pipe located in front of the seat. The air-cleaner case is provided with a bottom half and a top half. The bottom half is arranged in a space surrounded by a rear face of the head pipe and a pair of left and right main frames extending from the head pipe toward the rear of the vehicle. The top half is situated above the main frames. The top half is provided in a vertical two division structure. A dividing surface of the vertical two division structure of the top half is inclined in the vehicle-longitudinal direction. An air-cleaner element is mounted along the inclined dividing surface.

8 Claims, 10 Drawing Sheets

(51) Int. Cl.
  *B62J 99/00* (2009.01)
  *B62K 11/14* (2006.01)
  *B62M 7/06* (2006.01)
  *F02M 35/16* (2006.01)
  *B62K 11/04* (2006.01)
  *F02M 35/02* (2006.01)
  *F02M 35/04* (2006.01)
  *B62J 17/02* (2006.01)

(52) U.S. Cl.
  CPC ............... *B62J 99/00* (2013.01); *B62K 11/04* (2013.01); *B62K 11/14* (2013.01); *B62M 7/06* (2013.01); *F02M 35/02* (2013.01); *F02M 35/048* (2013.01); *F02M 35/162* (2013.01); *B62J 2099/002* (2013.01); *B62K 2202/00* (2013.01)

(58) Field of Classification Search
  CPC .. F02M 35/162; F02M 35/0201; F02M 35/04; F02M 35/044; F02M 35/10032; F02M 35/10039; F02M 35/10045; F02M 35/10052; F02M 35/10059; F02M 35/10111; F02M 35/10124; F02M 35/10262; F02M 35/12; F02M 35/16
  See application file for complete search history.

(56) References Cited

FOREIGN PATENT DOCUMENTS

| | | |
|---|---|---|
| JP | 2015-045320 | 3/2015 |
| JP | 2015-098220 | 5/2015 |

OTHER PUBLICATIONS

European Office Action dated Feb. 16, 2018, 5 pages.
Japanese Office Action dated Jan. 9, 2018, with English Machine Translation, 5 pages.
Japanese Office Action with Machine English Translation dated Oct. 10, 2017, 10 pages.
Korean Office Action with English Translation dated Mar. 27, 2018, 10 pages.

\* cited by examiner

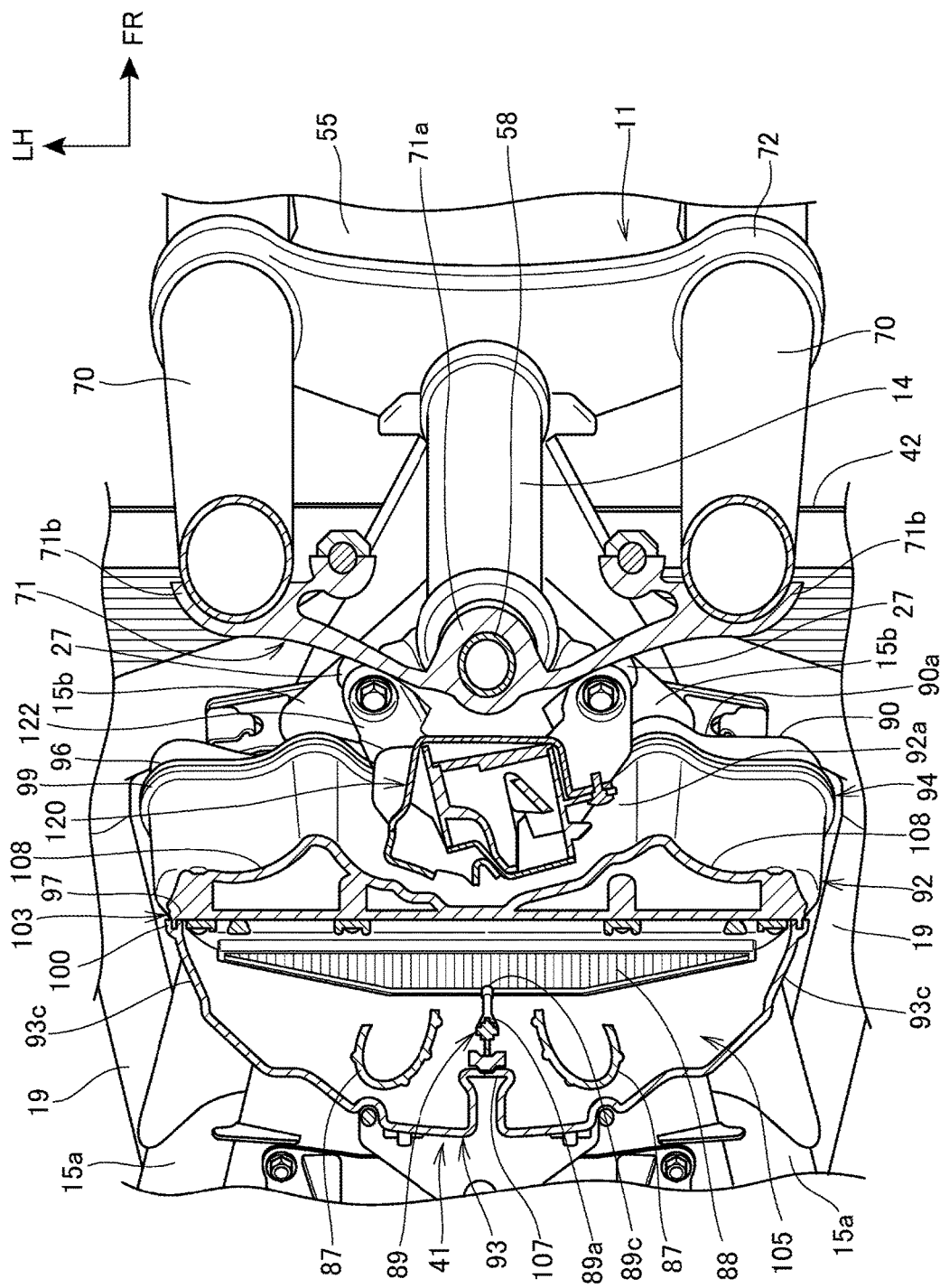

US 10,378,492 B2

AIR-CLEANER STRUCTURE OF SADDLE-RIDE TYPE VEHICLE

INCORPORATION BY REFERENCE

The present application claims priority under 35 U.S.C. § 119 to Japanese Patent Application No. 2016-040858 filed on Mar. 3, 2016. The content of the application is incorporated herein by reference in its entirety.

TECHNICAL FIELD

The present invention relates to an air-cleaner structure of a saddle-ride type vehicle.

BACKGROUND ART

Conventionally, some air-cleaner structures for saddle-ride type vehicles are known in which a horizontally-elongated air-cleaner case is disposed between an occupant seat and a head pipe located forward of the occupant seat (see Patent Literature 1, for example).

CITATION LIST

Patent Literature

[Patent Literature 1] JP-A NO. 2015-45320

SUMMARY OF INVENTION

Technical Problem

Such conventional air-cleaner cases are formed in a horizontally elongated shape in order to ensure the large area of an air-cleaner element, thus causing upsizing of the air-cleaner case in the front-rear direction.

The present invention has been made in light of the above-described circumstances and it is an object of the invention to increase the area of an air-cleaner element and simultaneously to downsize an air-cleaner case in an air-cleaner structure of a saddle-ride type vehicle.

Solution to Problem

To attain this object, the present invention provides an air-cleaner structure of a saddle-ride type vehicle. The air-cleaner structure includes an air-cleaner case (41) arranged between an occupant seat (13) and a head pipe (14) located forward of the occupant seat (13). The air-cleaner case (41) includes a bottom half (90) and a top half (91). The bottom half (90) is disposed in a space surrounded by a rear face (14b) of the head pipe (14) and a pair of left and right frame members (15), the frame members (15) extending from the head pipe (14) toward the rear of the vehicle. The top half (91) is situated above the frame members (15). The top half (91) is formed in a vertical two division structure. The vertical two division structure of the top half (91) has a diving surface (103) inclined in a vehicle-longitudinal direction. An air-cleaner element (88) is mounted along the dividing surface (103) inclined.

According to the present invention, the air-cleaner case includes a bottom half and a top half. The bottom half is arranged in a space surrounded with the rear face of the head pipe and a pair of left and right main frames which extends from the head pipe toward the rear of the vehicle. The top half is located above the main frames. The top half is formed in the vertical two division structure. A dividing surface of the vertical two division structure of the top half is inclined in the vehicle-longitudinal direction. An air-cleaner element is mounted along the inclined dividing surface. Accordingly, because the air-cleaner element is mounted to the vehicle-longitudinally-inclined dividing surface of the top half, the air-cleaner element is ensured to have the large area in the up-down direction, and also the space occupied by the air-cleaner element is reduced in the front-rear direction. Thus, it is possible to achieve not only an increase of the area of the air-cleaner element but also downsizing of the air-cleaner case. Further, because the dividing surface is situated above the pair of left and right main frames, easy access to the air-cleaner element is enabled, and maintainability can be enhanced.

Further, in the present invention, the saddle-ride type vehicle includes a top bridge (71) supporting a front fork (70) in a position above the head pipe (14). The bottom half (90) is arranged downward of an extension plane (P1) of a rotation path of the top bridge (71). The dividing surface (103) of the top half (91) is arranged to be inclined upward toward the front and also arranged to cross the extension plane (P1) of the rotation path.

According to the present invention, because the bottom half is placed downward of an extension plane of a rotation path of the top bridge, the joint between the bottom half and the top half is situated under the extension plane of the rotation path of the top bridge. Thus, a clearance between the joint and the top bridge can be ensured when the top bridge is rotated. Further, the dividing surface of the top half is arranged to be inclined upward toward the front and also to cross the extension plane of the rotation path of the top bridge. This enables providing the clearance between the top bridge and the front portion of the dividing surface of the top half. As a result, the air-cleaner case is able to be placed closer to the front side of the vehicle, so that the distance between the air-cleaner case and the occupant seat is increased to ensure plenty of room for the occupant.

Further, the present invention includes an intake duct (87) provided in a front portion of the top half (91) to take in outside air. A handlebar (73) for steering operation is spaced apart from a top face (71c) of the top bridge (71) by a handlebar post (74). The handlebar post (74) is provided between a lower end (73a) of the handlebar (73) and a top face (71c) of the top bridge (71). The suction duct (87) is placed under an extension plane (P2) of a rotation path of the lower end (73a) of the handlebar (73) and also placed above the extension plane (P1) of the rotation path of the top bridge (71).

According to the present invention, a suction duct taking in outside air is provided in the front portion of the top half. The steering handlebar is spaced apart from the top face of the top bridge by a handlebar post which is arranged between the top face of the top bridge and the lower end of the handlebar. The suction duct is arranged under an extension plane of a rotation path of the lower end of the handlebar. The suction duct is also arranged above the extension plane of the rotation path of the top bridge. In this way, the handlebar is placed upward by the handlebar post, thereby ensuring the space between the handlebar and the top bridge. Efficient arrangement of the suction duct is achieved while the clearance between handlebar and the top ridge is ensured.

Further, the invention present includes the suction duct (87) provided as a pair at the right and left. A handlebar locking device (120) is arranged between the left and right suction ducts (87) and also arranged in a space surrounded by the suction ducts (87) and the handlebar post (74).

According to the present invention, a handlebar locking device is arranged between the left and right suction ducts and also in a space surrounded with the suction dusts and the handlebar post. In this way, the space surrounded with the suction ducts and the handlebar post is effectively used for compact placement of the handlebar locking device. Further, there is little obstruction by the handlebar locking device, so that the suction ducts is able to be provided in adequate length.

Further, in the present invention, an intake-air sensor (89) is arranged between the left and right suction ducts (87) in the interior of the air-cleaner case (41).

According to the present invention, because an intake-air sensor is arranged between the left and right suction ducts in the interior of the air-cleaner case, the intake-air sensor is capable of detecting the intake air in a large space between the left and right suction ducts in the interior of the air-cleaner case. As a result, detection accuracy can be enhanced.

Further, in the present invention, the air-cleaner element (88) is formed in a trapezoid shape with a long side on a vehicle front side in top view.

According to the present invention, because the air-cleaner element is formed in a trapezoidal shape with a long side on the vehicle front side in side view, the side-to-side length of the rear portion of the air-cleaner element is shortened, and the rear portion of the air-cleaner case can be formed in a compact size. As a result, plenty of room for an occupant can be ensured at the rear of the air-cleaner case.

Further, in the present invention, the top bridge (71) supports the front fork (70) in the condition that an upper end of the front fork (70) protrudes beyond the top bridge (71).

According to the present invention, because the top bride supports the front fork in the condition that the upper end of the front fork protrudes beyond the top bridge, the top bridge is located at a lower level. This eliminates the necessity to reduce the size of the upper portion of the air-cleaner case in order to provide a clearance for the top bridge. As a result, the capacity of the upper portion of the air-cleaner case can be ensured.

Further, in the present invention, the saddle-ride type vehicle includes a steering clearance section (108) formed on the vehicle front side of the air-cleaner case (41) in order to avoid the front fork (70) during steering.

According to the present invention, because a steering clearance section is formed on the vehicle front side of the air-cleaner case in order to avoid the front fork during steering, the air-cleaner case is able to be placed closer to the front fork to ensure plenty of room for an occupant at the rear of the air-cleaner case.

Further, in the present invention, the saddle-ride type vehicle includes: a fuel tank (57) arranged under the occupant seat (13); and a straddling section (56) provided in front of the occupant seat (13) to be depressed more downward than the occupant seat (13). The fuel tank (57) has a fuel filler hole (57a) exposed from a lid (44a). The lid (44a) is provided on a side of the straddling-section-(56) of the occupant seat (13).

According to the present invention, a straddling section is provided in front of the occupant seat to be depressed more downward than the occupant seat. A fuel tank placed under the occupant seat has a fuel filler hole. The fuel filler hole is exposed from the lid. The lid is provided on a side of the straddling-section of the occupant seat. A space created by placing the air-cleaner case at the rear of the top bridge is used to provide the straddling section in front of the occupant seat. The fuel tank is able to be effortlessly supplied with fuel through the fuel filler hole exposed from the lid which is provided on the straddling-section side of the occupant seat.

Further, in the present invention, the dividing surface (103) of the top half (91) is formed to be inclined upward toward the front along a line passing through above an upper end of the top bridge (71) in side view.

According to the present invention, because the dividing surface of the top half is arranged to be inclined upward toward the front along a line passing through above the upper end of the top bridge in side view, the air-cleaner element is ensured to have a large area in the up-down direction, and also the vehicle-longitudinal space occupied by the air-cleaner element is reduced. As a result, not only the area of the air-cleaner element is able to be increased, but also the air-cleaner case is able to be made smaller in size in the front-rear direction.

Advantageous Effects of Invention

With the air-cleaner structure of the saddle-ride type vehicle according to the present invention, downsizing of the air-cleaner case is achieved while the area of the air-cleaner element is increased.

Further, while the clearance for the top bridge is ensured, the air-cleaner case can be arranged closer to the front of the vehicle, thus ensuring a larger space for an occupant.

Further, the efficient placement of the suction ducts is enabled while the clearance for the handlebar and the top bridge is ensured.

Further, the space between the suction ducts and the handlebar post is effectively used for compact placement of the handlebar locking device.

Further, it is possible to increase the degree of detection accuracy of the intake-air sensor.

Further, a side-to-side length of the rear portion of the air-cleaner element is shortened to make the rear portion of the air-cleaner case compact, contributing to the expanded space for the occupant.

Further, the capacity of the upper portion of the air-cleaner case is ensured.

Further, by the steering clearance section, the air-cleaner case is able to be placed closer to the front forks.

Further, the fuel tank is readily refueled through the fuel filler hole exposed from the lid which is provided on a side of the straddling-section of the occupant seat.

Further, because the dividing surface of the top half is arranged to be inclined upward toward the front at a larger angle than the top bridge, the area of the air-cleaner element is able to be increased and simultaneously the air-cleaner case is able to be made smaller in size in the front-rear direction.

BRIEF DESCRIPTION OF DRAWINGS

FIG. 10 is a sectional view taken along X-X line of FIG. 3.

DESCRIPTION OF EMBODIMENTS

Embodiments according to the present invention will now be described with reference to the drawings. It is noted that, throughout the description, references to directions such as front, rear, left, right, up and down are made with reference to a vehicle body unless otherwise stated. It is also noted that, in all the drawings, reference sign FR denotes the forward direction of the vehicle body, reference sign UP denotes the upward direction of the vehicle body, and reference sign LH denotes the leftward direction of the vehicle body.

Figure 1:
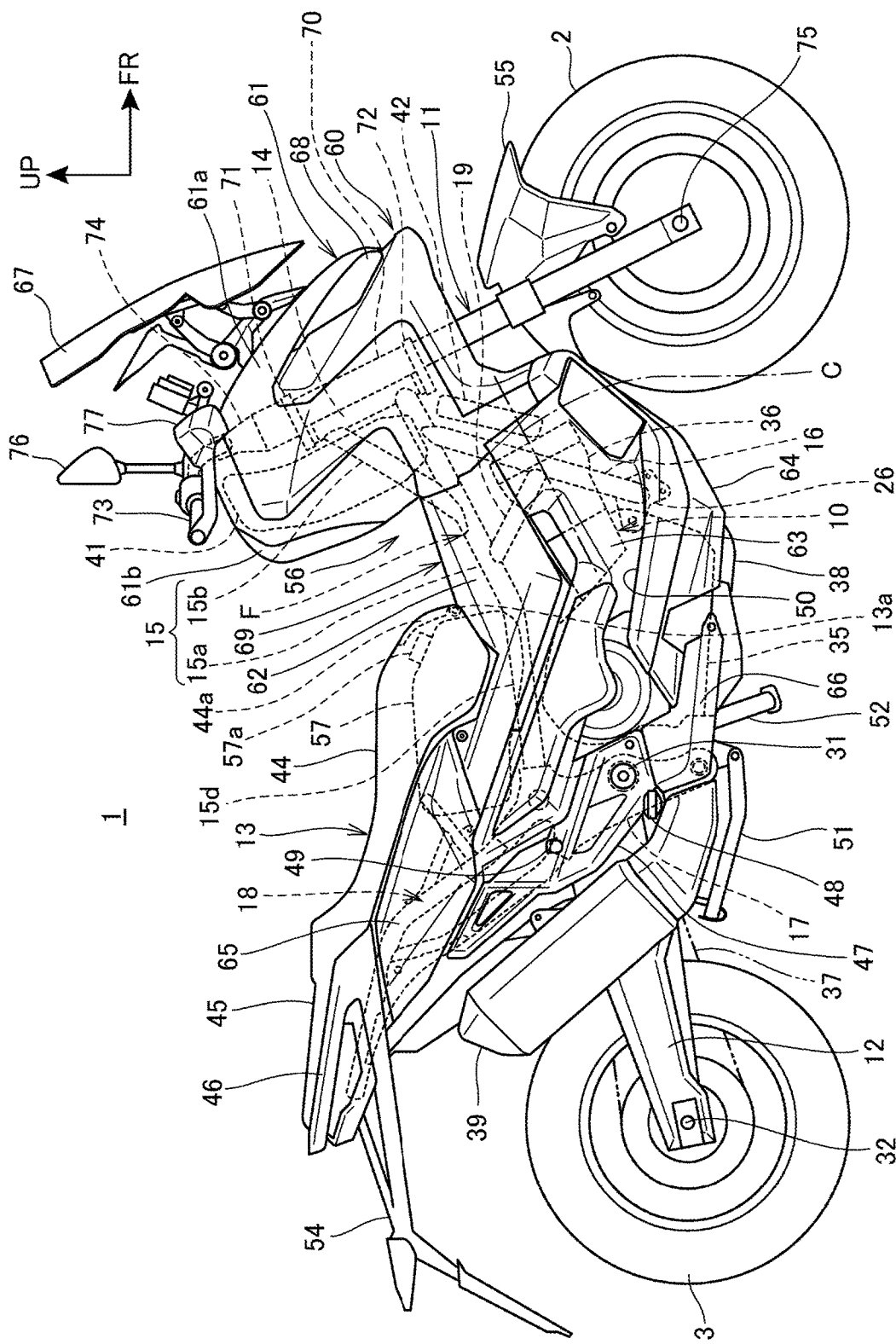
FIG. 1 is a right side view of a motorcycle according to an embodiment of the invention.

FIG. 1 is a right side view of a motorcycle according to an embodiment of the present invention. Note that only one of each of pairs of left and right components is shown in the side view in the following description.

A motorcycle 1 is a vehicle having an engine 10 as a power unit supported by a body frame F, the body frame F having a front end at which a steering system 11 is steerably supported to steerably support a front wheel 2, the body frame F having a rear portion on which a swing arm 12 is provided to support a rear wheel 3. The motorcycle 1 is a saddle-ride type vehicle that has a riding seat 13 (occupant seat) mounted above a rear portion of the body frame F so that an occupant is to sit astride the seat 13.

Figure 2:
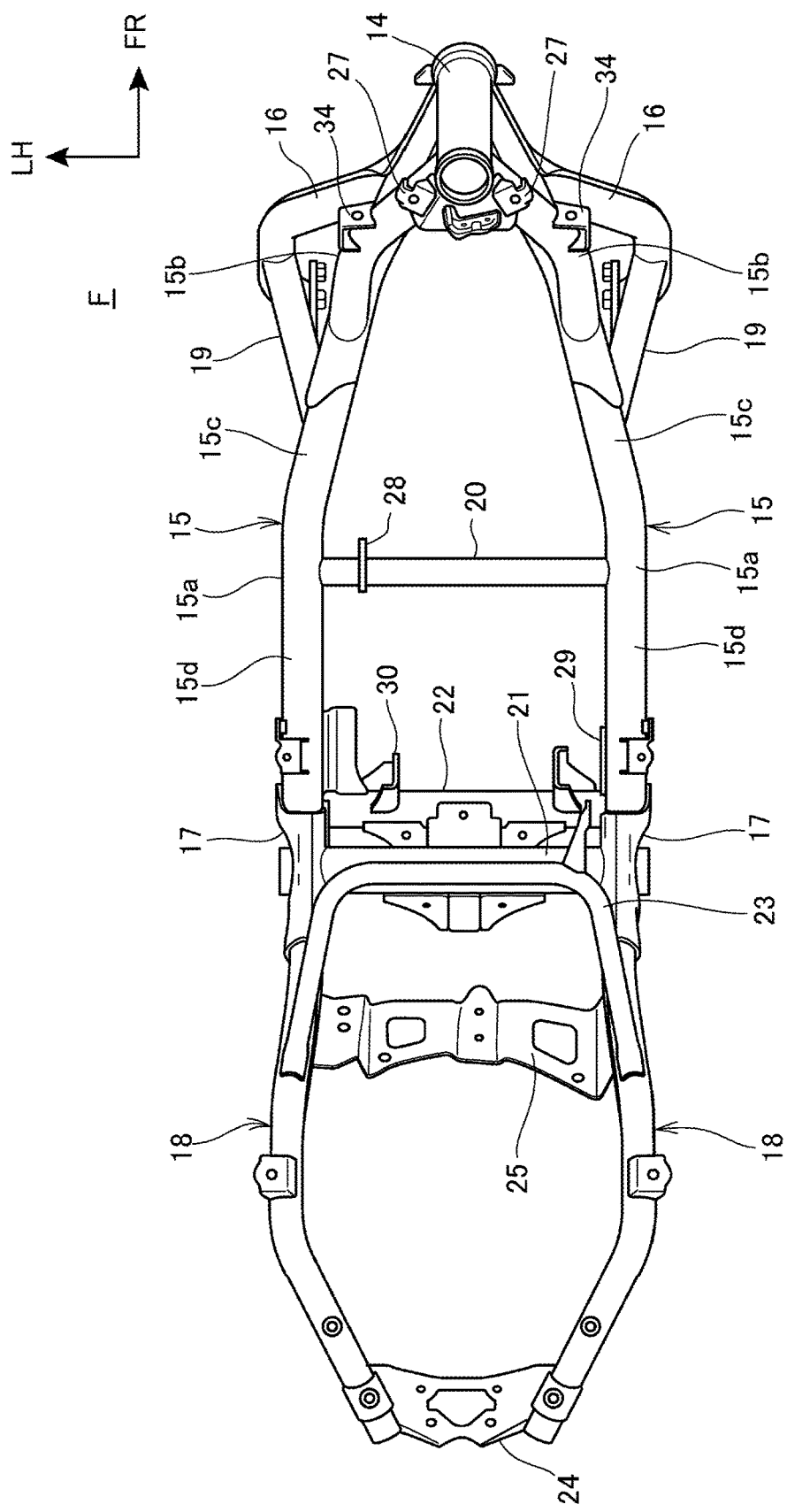
FIG. 2 is a top view of a body frame as viewed from above.

FIG. 2 is a top view of the body frame F viewed from above.

Referring to FIG. 1 and FIG. 2, the body frame F includes: a head pipe 14 which is placed at the front end; a pair of left and right main frames 15 (frame members) which extends downward toward the rear from a rear portion of the head pipe 14; a pair of left and right down frames 16 which extends from front ends of the main frames 15 toward the downward and rearward direction; a pair of left and right pivot frames 17 which extends downward from rear ends of the main frames 15; and a pair of left and right seat frames 18 which extends upwardly toward the rear from upper portions of the pivot frames 17 to the vehicle rear end.

The main frames 15 include main-frame bodies 15a and reinforcing frames 15b. Each of the main-frame bodies 15a extends from a lower portion of the head pipe 14 to be relatively gently inclined downwardly toward the rear. Each of the reinforcing frames 15b is connected between an upper portion of the head pipe 14 and a front portion of the corresponding main-frame body 15a. In turn, the main-frame bodies 15a include front frame portions 15c and rear frame portions 15d. The front frame portions 15c extend rearward from the head pipe 14 such that distance between the front-frame portions 15c in a vehicle width direction is increased gradually toward the rearmost ends of the front-frame portions 15c as viewed from the top. The rear frame portions 15d extend rearward respectively from the rear ends of the front frame portions 15c in approximately parallel to each other.

The left and right reinforcing frames 15b extend rearward such that the distance between them along the vehicle width direction is increased gradually toward the rearmost ends of the reinforcing frames 15b. The left and right reinforcing frames 15b also extend to be inclined downwardly toward the rear at a larger angle than the main-frame bodies 15a. The reinforcing frames 15b are provided with stays 27 which are placed at the front ends of the respective reinforcing frames 15b. The reinforcing frames 15b are also provided with air-cleaner case stays 34 located rearward of the stays 27.

The body frame F further includes a pair of left and right connecting frames 19. Each of the connecting frames 19 connects the corresponding down frame 16 to a vehicle-longitudinal midpoint portion of the corresponding main-frame body 15a.

Each of the pivot frames 17 has a pivot hole (not shown) formed in a midpoint portion in the up-down direction. A pivot shaft 31 is inserted into the pivot holes to couple the left and right pivot frames 17 to each other in the vehicle width direction.

The body frame F includes a front cross frame 20, an intermediate cross frame 21 and a lower cross frame 22. The front cross frame 20 couples the front portions of the respective rear frame portions 15d of the main-frame bodies 15a to each other in the vehicle width direction. The intermediate cross frame 21 couples the upper ends of the respective pivot frames 17 to each other in the vehicle width direction. The lower cross frame 22 couples the lower ends of the respective pivot frames 17 to each other in the vehicle width direction.

The body frame F further includes a rear cross frame 23, a rear-end cross frame 24 and a cross frame 25. The rear cross frame 23 couples the front portions of the respective seat frames 18 to each other in the vehicle width direction. The rear-end cross frame 24 couples the rear ends of the respective seat frames 18 to each other in the vehicle width direction. The cross frame 25 is located between the rear cross frame 23 and the rear-end cross frame 24 to couple the seat frames 18 to each other in the vehicle width direction.

The body frame F includes: a front engine hanger 26 that is placed at the lower ends of the down frames 16 (FIG. 1); an upper engine hanger 28 that is placed on the front cross frame 20 (FIG. 2); a rear engine hanger 29 that is placed at the rear ends of the main-frame bodies 15a; and a lower engine hanger 30 that is placed on the lower cross frame 22.

As shown in FIG. 1, the swing arm 12 is pivotally supported at the front end by the pivot shaft 31, so that the swing arm 12 swings about the pivot shaft 31 in the up-down direction. The rear wheel 3 is journaled on a rear-wheel axle 32 that is inserted into the rear end of the swing arm 12.

The engine 10 is installed forward of the pivot frames 17 in such a manner as to be suspended from the body frame F.

The engine 10 includes a crankcase 35 and a cylinder section 36 which extends from a front portion of the crankcase 35 in the forward and upward direction. The crankcase 35 supports a crankshaft (not shown) extending in the vehicle width direction. The crankcase 35 is located downward of the rear frame portions 15d of the main frames 15. The cylinder section 36 extends along the main frames 15 in the forward and upward direction such that the front portion of the cylinder section 36 is located between the left and right down frames 16 and also between the left and right connecting frames 19. A transmission is housed in a rear portion of the crankcase 35.

The engine 10 is supported by the body frame F through the front engine hanger 26, upper engine hanger 28, rear engine hanger 29 and the lower engine hanger 30.

The engine 10 is a forward canted engine with the cylinder axis C in the cylinder section 36 extending nearly horizontally rather than vertically. A space is ensured above the engine 10.

The output of the engine 10 is transmitted to the rear wheel 3 through a chain 37. The chain 37 is looped around the output shaft (not shown) of the engine 10 and the rear wheel 3.

An exhaust pipe 38 of the engine 10 extends downward out of the cylinder head of the cylinder section 36, and then extends rearward through under the engine 10 to be connected to a muffler 39. The muffler 39 is located on the right side of the swing arm 12.

An air-cleaner case 41 is placed upward of the front portions of the main frames 15 and rearward of the head pipe 14 in order to clean air (outside air), the air being to be fed to the engine 10.

A radiator 42 of the engine 10 is placed downward of the head pipe 14 and forward of the cylinder section 36.

The seat 13 integrally includes a front seat 44 for a rider (occupant) and a rear seat 45 for a passenger (pillion passenger). The rear seat 45 is provided at a higher level than the front seat 44. The seat 13 is mounted rotatably in the up-down direction through a hinge 13a which is provided at the front end of the seat 13.

The front seat 44 is placed upward of the rear portions of the main frames 15 and upward of the pivot frames 17. Also, the front seat 44 is located upward of a rear portion of the crankcase 35.

The rear seat 45 is arranged upward of the rear portions of the seat frames 18. Grips 46 are provided respectively on the left and right sides of the rear seat 45 so that the passenger sitting on the rear seat 45 can grasp the grips 46.

A pair of left and right plate-shaped step holders 47 is mounted on the outer sides of the respective pivot frames 17. The step holders 47 support a pair of left and right sub-steps 48 for the rider, respectively. The step holders 47 also support a pair of left and right passenger steps 49 for the passenger, respectively. A pair of left and right main steps 50 for the rider is mounted forward and downward of the front seat 44.

A main stand 51 is coupled to lower portions of the pivot frames 17. A side stand 52 is mounted to a left end of a lower portion of the body frame F.

The motorcycle 1 is provided with a body cover 60 covering the vehicle body. The body cover 60 includes a front cover 61, an under-seat cover 62 and a pair of left and right intermediate side covers 63. The front cover 61 covers the head pipe 14 and an upper portion of the steering system 11 from front, rear, left side and right side. The under-seat cover 62 is located rearward of a lower portion of the front cover 61 to cover the main frames 15 from above, left side and right side. The pair of left and right intermediate side covers 63 is located downward of the under-seat cover 62 to cover the engine 10 and the rear portion of the body frame F from side.

The body cover 60 further includes an undercover 64, a pair of left and right rear covers 65 and a pair of left and right frame covers 66. The undercover 64 covers the engine 10 from below. The pair of left and right rear covers 65 is placed rearward of the under-seat cover 62 to cover an area downward of the seat 13 from sides. The pair of left and right frame covers 66 covers a lower rear portion of the engine 10 and lower portions of the pivot frames 17 from sides.

More specifically, the front cover 61 includes a front-face cover 61a and a rear-face cover 61b. The front-face cover 61a covers the head pipe 14 and the upper portion of the steering system 11 from front and from left side and right side. The rear-face cover 61b covers the head pipe 14 and the upper portion of the steering system 11 from rear.

A plate-shaped windscreen 67 extending in the up-down direction is mounted to the front-face cover 61a. A headlight 68 is mounted to the front-face cover 61a.

The motorcycle 1 further includes a rear fender 54 covering the rear wheel 3 from above, and a front fender 55 covering the front wheel 2 from above.

A front portion of the under-seat cover 62 and front portions of the intermediated side covers 63 are combined together in the up-down direction to form a tunnel-shaped center tunnel 69 of inverted U-shaped cross section. The front portion of the body frame F and the cylinder section 36 are housed within the center tunnel 69.

The top surface of the center tunnel 69 is placed at a lower level than the top surface of the front seat 44, so that a downward-depressed straddling section 56 is created between the front face of the front seat 44 and the rear-face cover 61b. The rider who is to sit/is sitting on the front seat 44 can effortlessly get on/off the motorcycle 1, because the rider can pass his/her leg over the straddling section 56.

A fuel tank 57 is arranged downward of the front seat 44 and also arranged upward of the rear frame portions 15d. The fuel tank 57 includes a fuel filler hole 57a formed in the top face of a front portion of the fuel tank 57. A storage (not shown) is placed rearward of the fuel tank 57. Upon upward opening of the seat 13 through the hinge 13a, the fuel tank 57 and the storage are exposed upward.

An opening 44d (FIG. 5) and a filler-hole lid 44a (lid) closing the opening 44d are provided on a central portion of the front end of the front seat 44 in the vehicle width direction. The filler-hole lid 44a is mounted rotatably about the hinge 44b in the front-rear direction (FIG. 3), the hinge 44b being located at the lower end of the filler-hole lid 44a. The filler-hole lid 44a is rotated about the filler-hole lid 44a toward the straddling section 56. Thereupon, the fuel filler hole 57a is exposed from the opening. Therefore, without opening the seat 13, only opening the filler-hole lid 44a enables refueling through the fuel filler hole 57a. On this occasion, the space above the straddling section 56 can be used to carry out the refueling. As a result, workability is improved.

Figure 3:
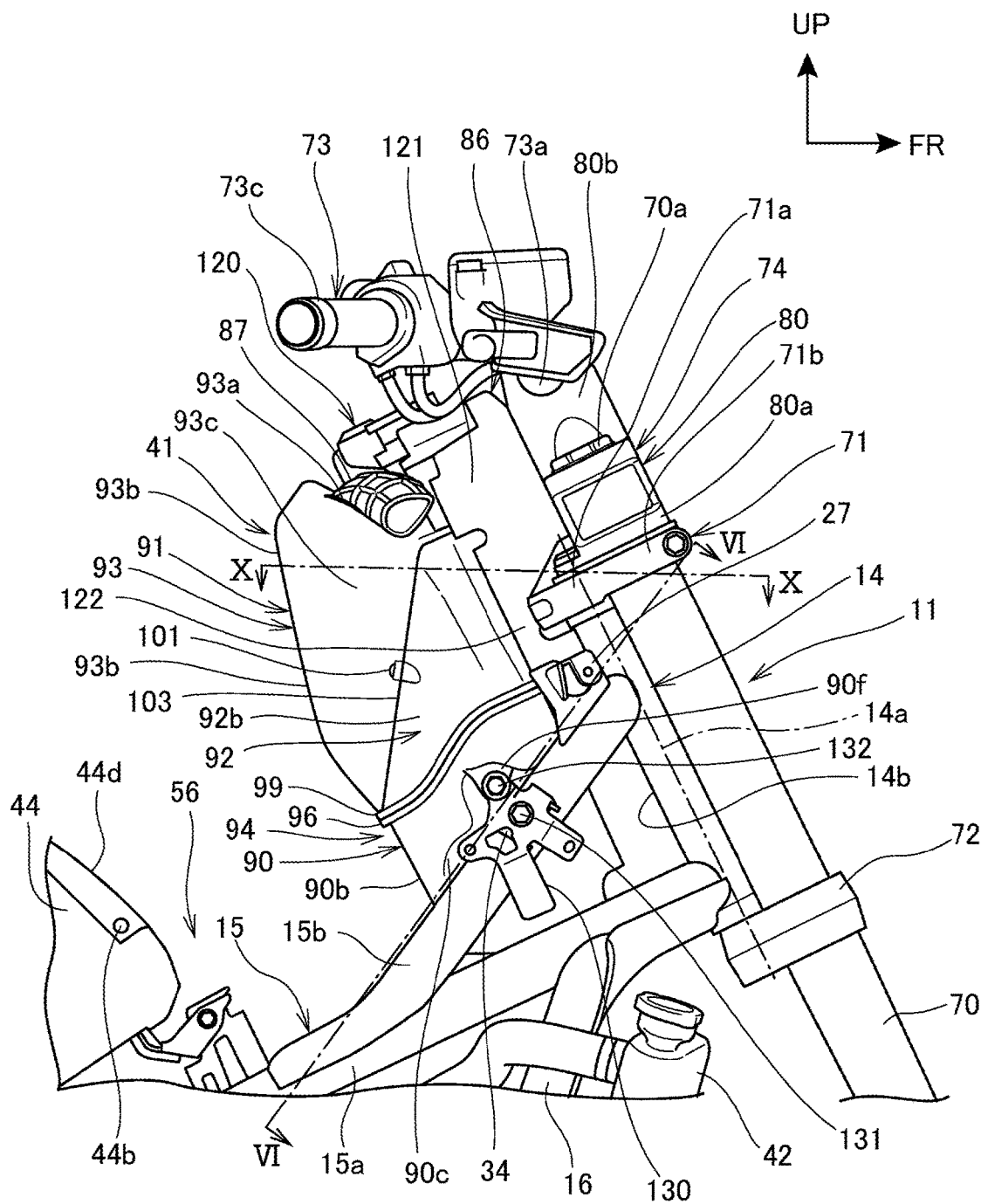
FIG. 3 is a right side view showing the structure of the peripheries of an air-cleaner case and a steering system.
Figure 4:
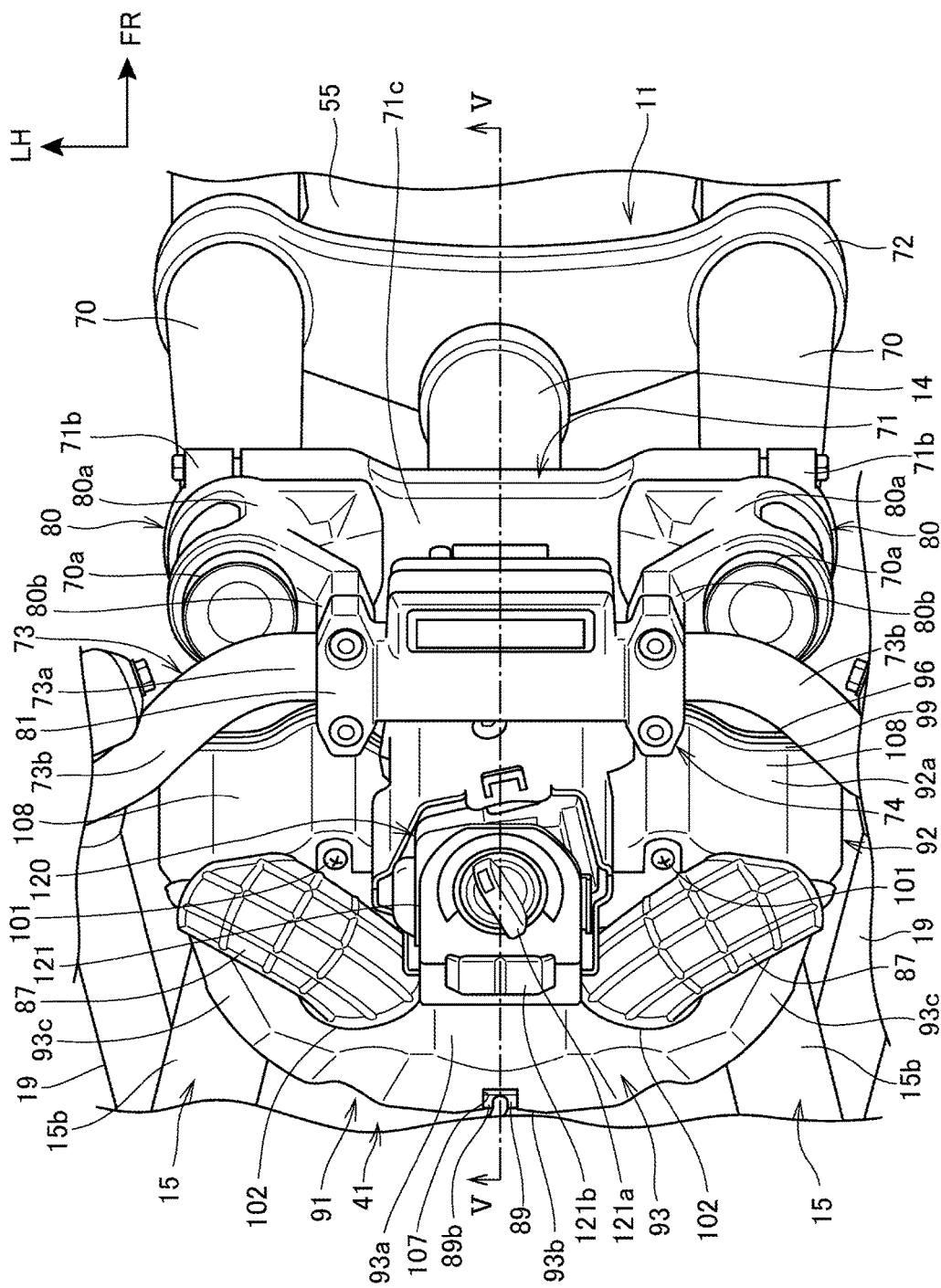
FIG. 4 is a top view showing the structure of the peripheries of the air-cleaner case and the steering system as viewed from above.
Figure 5:
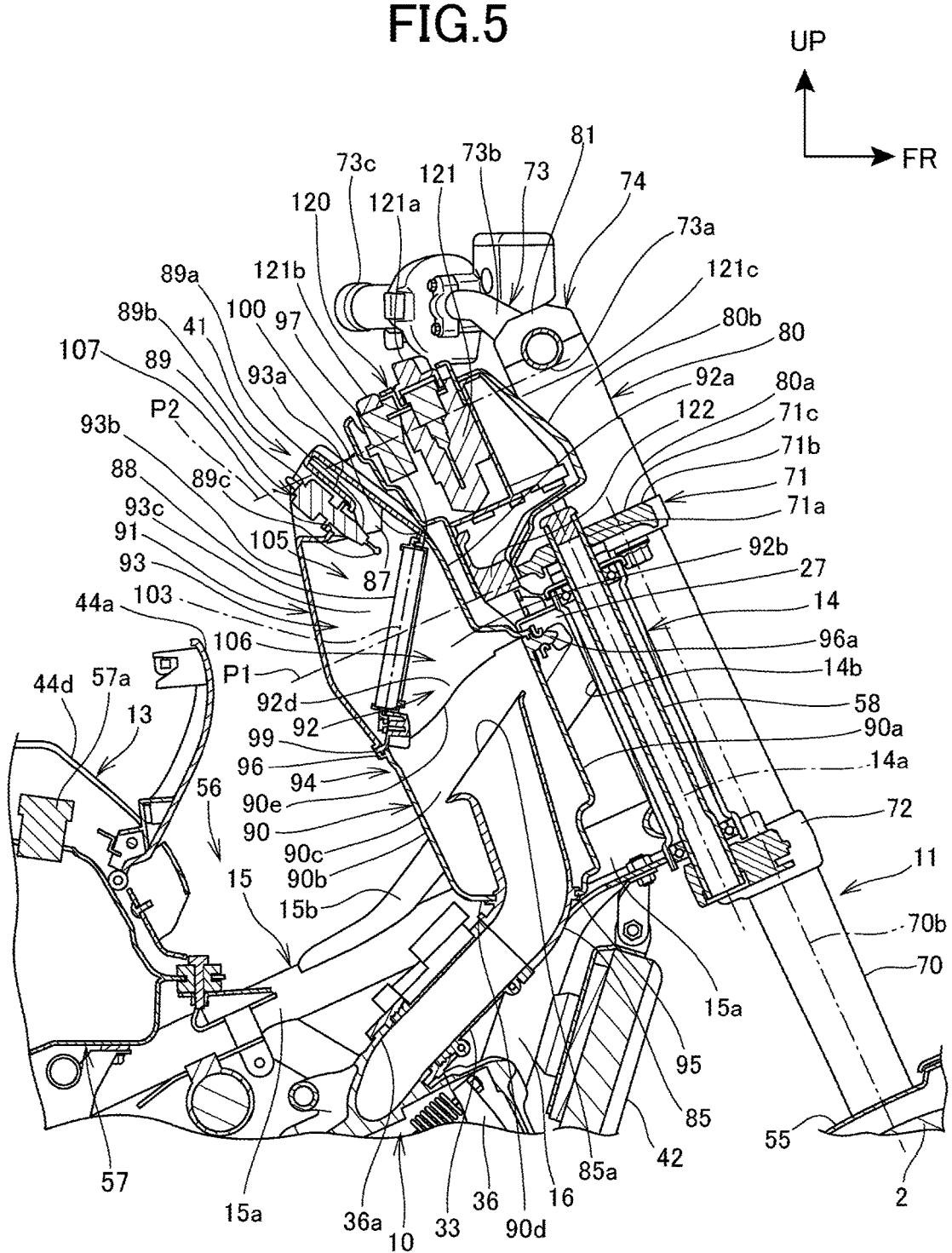
FIG. 5 is a sectional view taken along V-V line of FIG. 4.
Figure 6:
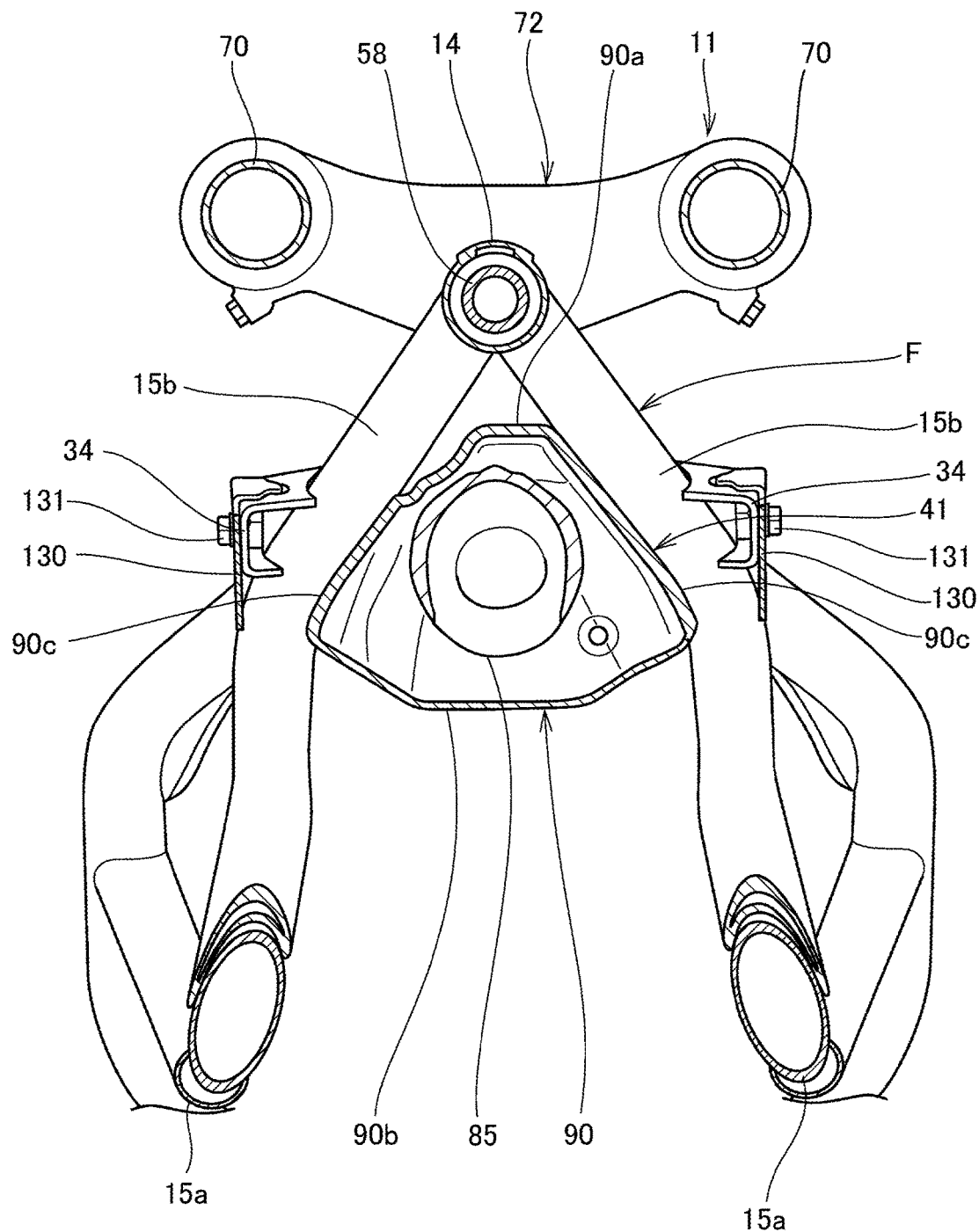
FIG. 6 is a sectional view taken along VI-VI line of FIG. 3.

FIG. 3 is a right side view illustrating the structure of the peripheries of the air-cleaner case 41 and the steering system 11. FIG. 4 is a top view of the structure of the peripheries of the air-cleaner case 41 and the steering system 11 as viewed from above. FIG. 5 is a sectional view taken along V-V line of FIG. 4. FIG. 6 is sectional view taken along VI-VI line of FIG. 3. Here, FIG. 3 to FIG. 6 shows the state when the body cover 60 and the like are removed. Incidentally, FIG. 5 illustrates the state when the filler-hole lid 44a is opened. Further, FIG. 6 does not show any component other than the body frame F, the steering system 11 and the air-cleaner case 41.

Referring to FIG. 1 and FIGS. 3 to 6, the steering system 11 includes: a steering shaft 58 (FIG. 5) that is axially supported by the head pipe 14 in a rotatable manner; a pair of left and right front forks 70 that is arranged on both the left and right sides the front wheel 2 to support the front wheel 2; a top bridge 71 that is secured to the upper end of the steering shaft 58 to couple the left and right front forks 70 to each other; and a bottom bridge 72 that is secured to the bottom end of the steering shaft 58 to couple the left and right front forks 70 to each other. The steering system 11 further includes: a handlebar 73 as a steering provided above the front forks 70; and a handlebar post 74 securing the handlebar 73 to the top bridge 71.

The front wheel 2 is journaled on a front-wheel axle 75 that is passed between the lower ends of the respective front forks 70.

As shown in FIG. 1, the handlebar 73 is provided with a pair of left and right rearview mirrors 76 and a pair of left and right knuckle guards 77.

An axis 14a of the head pipe 14 is arranged to be inclined rearward relative to the vertical direction at a caster angle set for the motorcycle 1. That is, the axis 14a is parallel to the front forks 70.

The top bridge 71 is formed in a plate shape perpendicular to the axis 14a of the head pipe 14. The top bridge 71 is shaped to be longer in the vehicle width direction than in the vehicle-longitudinal direction. Because of this, the top bridge 71 is inclined upwardly toward the front in side view. The top bridge 71 is located upward of the head pipe 14.

The top bridge 71 includes a shaft fixing portion 71a on a central portion of the top bridge 71 in the vehicle width direction, and the top bridge 71 also includes fork fixing portions 71b at both ends of the top bridge 71 in the vehicle width direction. The steering shaft 58 is inserted into and fixed in the shaft fixing portion 71a. The upper portions of the front forks 70 are fitted into and fixed in the fork fixing portions 71b.

In step with operation through the handlebar 73, the steering system 11 is turned for steering. At this time, the top bridge 71 is rotated about the steering shaft 58. The extension plane P1 of the rotation path of the top bridge 71 extends rearward at right angles to the axis 14a of the head pipe 14 in side view.

Each of the front forks 70 is formed in a circular cross-section pipe shape extending in a straight line. The front forks 70 include fork protrusions 70a placed at the upper ends of the respective front forks 70. The fork protrusions 70a protrude upward from a top face 71c of the top bridge 71. In other words, the top bridge 71 supports the front forks 70 in a position downward of the upper ends of the front forks 70.

The handlebar post 74 includes a pair of left and right holder bodies 80 and a cap 81. The cap 81 is attached to the top faces of the holder bodies 80. The pair of left and right holder bodies 80 is secured to the top face 71c of the top bridge 71 to extend upward. The handlebar post 74 extends upward in a position inclined rearward along the axes 70b of the front forks 70 in side view. The handlebar post 74 is secured to a point forward of the steering shaft 58.

The holder bodies 80 include bases 80a and arms 80b. The bases 80a include tube portions provided around the outer peripheries of the fork protrusions 70a. The arms 80b extend upward from upper ends of inner portions of the bases 80a in the vehicle width direction. The handlebar 73 is held between the cap 81 and the top faces of the arms 80b. In this manner, because the handlebar 73 is supported by the handlebar post 74 extending upward from the top bridge 71, a large spacing between the handlebar 73 and the top bridge 71 is ensured.

The handlebar 73 integrally includes a handlebar central portion 73a (lower end), bending portions 73b and extension portions 73c. The handlebar central portion 73a is located above the top bridge 71, and the handlebar central portion 73a extends in the vehicle width direction. The bending portions 73b rise respectively from both ends of the handlebar central portion 73a to extend outward in the vehicle width direction and to extend upward toward the rear. The extension portions 73c extend respectively from upper ends of the bending portions 73b, 73cb toward outside beyond the front forks 70 in the vehicle width direction.

The handlebar 73 is mounted above the front forks 70 by securing both the left and right ends of the handlebar central portion 73a to the handlebar post 74. After being attached to the vehicle body, the handlebar central portions 73a is served as the lower end of the handlebar 73. The handlebar grips that are to be grasped by the rider are mounted at the ends of the extension portions 73c.

The steering operation of the steering system 11 causes the handlebar 73 to rotate about the steering shaft 58. The extension plane P2 of the rotation path of the handlebar central portion 73a which is the lower end of the handlebar 73 extends rearward at right angles to the axis 14a of the head pipe 14 in side view. The extension plane P2 is located above the extension plane P1.

As shown in FIG. 1, the air-cleaner case 41 is accommodated within the front cover 61, and the air-cleaner case 41 is situated forward of the straddling section 56. Specifically, the air-cleaner case 41 is accommodated between the rear surface of the head pipe 14 and the rear-face cover 61b.

Referring to FIG. 3 to FIG. 5, the air-cleaner case 41 is formed in a box shape elongated along the head pipe 14 in the up-down direction. The air-cleaner case 41 is positioned to be inclined rearward as a whole. A lower portion of the air-cleanser case 41 is disposed between the left and right main frames 15. An upper portion of the air-cleaner case 41 extends upward of the straddling section 56 to be situated at the rear of top bridge 71 and the handlebar post 74.

An operating device 120 (a handlebar locking device) for control operation by the rider or the like is placed in the space between the upper portion of the air-cleaner case 41 and the handlebar post 74. The operating device 120 is a handlebar locking device including a handlebar locking mechanism (not shown) that restricts the rotation of the steering system 11 when parking.

The operating device 120 is formed in an approximate box shape as viewed from above. The operating device 120 is situated on the central area in the vehicle width direction, and the operating device 120 is situated between the left and right front forks 70 in the vehicle width direction.

The operating device 120 includes a body 121 and a fixed section 122. The body 121 is disposed between the handlebar post 74 and the upper portion of the air-cleaner case 41. The fixed section 122 extends downward between the top bridge 71 and the upper portion of the air-cleaner case 41 from the body 121, and then the fixed section 122 is fixed to the stays 27 of the reinforcing frames 15b.

The body 121 is provided with a first operating portion 121a and a second operating portion 121b which are placed on the top face of the body 121, the first and second operating portions 121a, 121b being to be operated by the rider or the like. The first operating portion 121a is an operating portion for ON/OFF switching of the main power source of the motorcycle 1 and for operation switching of the handlebar locking mechanism (not shown). If the first operating portion 121a is operated to switch the handlebar locking mechanism into lock mode, a protrusion member (not shown) that is provided in the operating device 120 protrudes to be engaged with the top bridge 71, so that the rotation of the steering system 11 is restricted.

The second operating portion 121b is an operating portion for switching to lock mode of the seat 13 and for switching to lock mode of the filler-hole lid 44a.

A front portion 121c (FIG. 5) of the body 121 is situated in the space between the top bridge 71 and the handlebar central portion 73a and also between the left and right holder bodies 80.

The air-cleaner case 41 is connected to an upper end of a throttle body 33 through a connection tube 85 which extends from a lower end of the air-cleaner case 41 in the downward and rearward direction. The throttle body 33 extends downward toward the rear so that a lower end of the throttle body 33 is connected to an intake port 36a which is situated on a top face of the cylinder section 36.

The air-cleaner case 41 is provided with: a pair of left and right suction ducts 87 which is placed in an upper portion of the air-cleaner case 41; an air-cleaner element 88 provided within the air-cleaner case 41; an intake-air sensor 89 detecting a temperature of air (intake air) drawn into the air-cleaner case 41; and the above-described connection tube 85.

The air-cleaner case 41 is formed of resin materials. The air-cleaner case 41 is formed in a box shape by combining a bottom half 90 and a top half 91 together in the up-down direction. The bottom half 90 is disposed in the space surrounded by the left and right reinforcing frames 15b of the main frames 15 and a rear face 14b of the head pipe 14. The top half 91 is situated above the reinforcing frames 15b.

Further, the top half 91 has a vertically-separable vertical two division structure. The top half 91 is provided with an intermediate case 92 joined to the bottom half 90, and further an upper case 93 attached to the top face of the intermediate case 92.

Specifically, the bottom half 90 and the intermediate case 92 are joined together to form a lower case 94. The joining of the bottom half 90 and the intermediate case 92 is accomplished by, for example, welding or bonding. In other words, the bottom half 90 and the intermediate case 92 are separately manufactured in the respective manufacturing stages. Then, the bottom half 90 and the intermediate case 92 are integrated into one as the lower case 94 at a stage prior to the stage to be assembled to the motorcycle 1.

Figure 7:
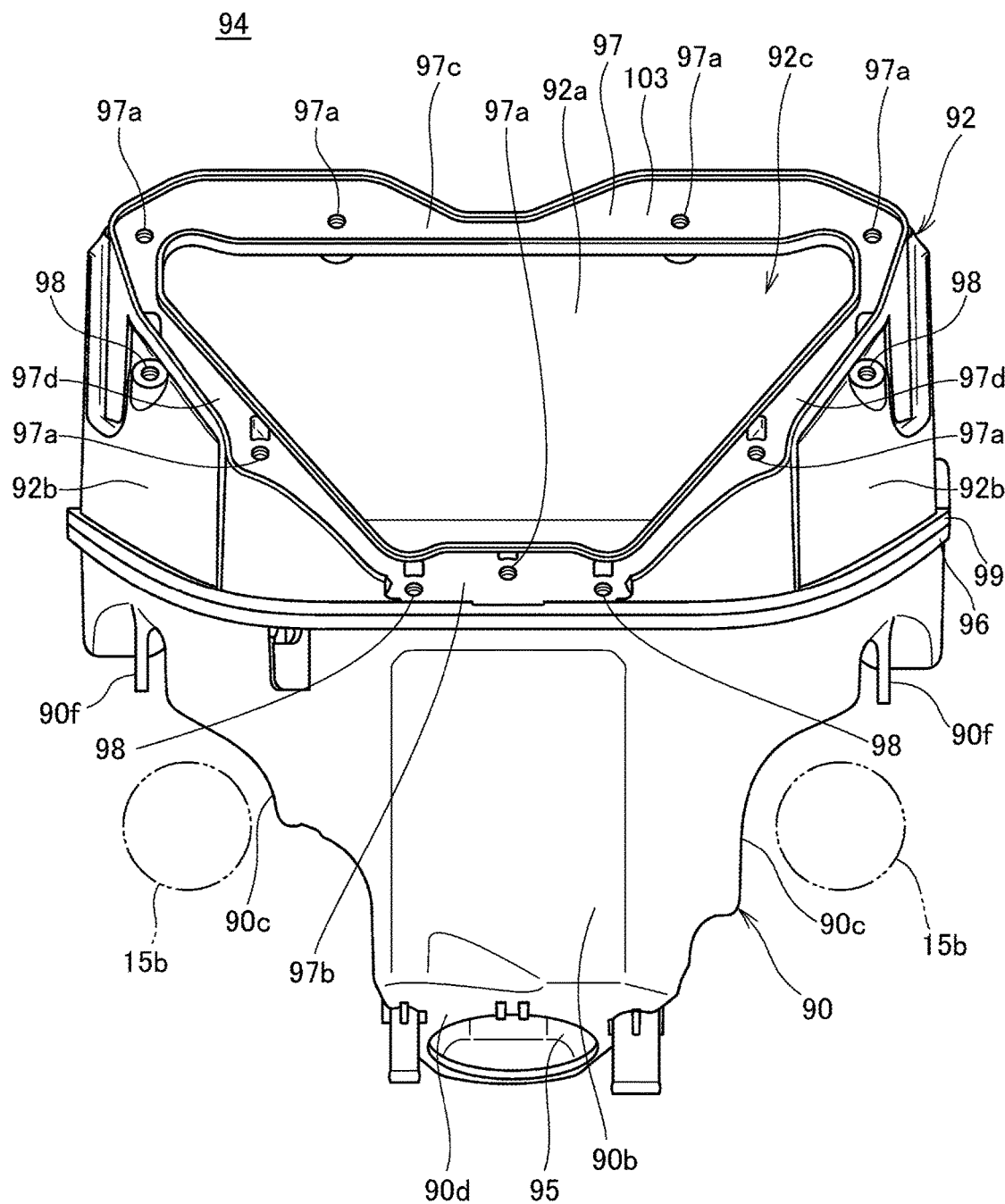
FIG. 7 is a front view showing singly a lower case as viewed from rear.

FIG. 7 is a front view showing singly the lower case 94 as viewed from rear.

Referring to FIG. 3 to FIG. 7, the bottom half 90 is formed in a box shape with an open top side. The bottom half 90 has a lower portion located between the left and right main-frame bodies 15a, and has an upper portion located between the left and right reinforcing frames 15b.

A bottom-half front 90a configuring the front face of the bottom half 90 extends upward toward the rear in approximately parallel to the rear face 14b of the head pipe 14 in side view. A bottom-half rear 90b configuring the rear face of the bottom half 90 extends upward toward the rear in parallel to the bottom-half front 90a.

The further the left and right sides 90c of the bottom half 90 extend from the top ends toward the bottom ends, the further the distance between the left and right sides 90c in the vehicle width direction is reduced. The reinforcing frames 15b are located on the outer sides of the sides 90c.

A pair of left and right attachment portions 90f is provided on an upper portion of the bottom half 90 to extend downward from the left and right sides of the upper portion of the bottom half 90. The attachment portions 90f are located outward of and also upward of the reinforcing frames 15b.

The air-cleaner case 41 is secured to the body frame F through the bottom half 90. Specifically, as shown in FIG. 3 and FIG. 6, the bottom half 90 is secured to the air-cleaner case stays 34 of the reinforcing frames 15b through a pair of left and right brackets 130 which is secured to the attachment portions 90f.

Each of the brackets 130 is formed in a vertically extending plate shape, and the bracket 130 is secured to an outer face of the corresponding air-cleaner case stay 34 with a bracket fixing bolt 131 inserted from the outside in the vehicle width direction.

The attachment portions 90f of the bottom half 90 are secured to upper portions of the brackets 130 with case fixing bolts 132 which are inserted into the upper portions of the brackets 130 from the outside in the vehicle width direction.

A tube fixing hole 95 is formed in an underside 90d of the bottom half 90 so that the connection tube 85 is inserted into and secured to the tube fixing hole 95.

An opening 90e is formed in the top face of the bottom half 90. The opening 90e is defined by the top edges of the respective bottom-half front 90a, bottom-half rear 90b and sides 90c. A lower flange 96 is formed on the entire perimeter of the upper edge of the bottom half 90, and the lower flange 96 protrudes outward of the opening 90e. The opening 90e is inclined upward toward the front in side view. Therefore, the lower flange 96 formed along the opening 90e is also inclined upward toward the front. The lower flange 96 has a function as a rib to improve the strength and stiffness of the bottom half 90.

The lower flange 96 has a front end 96a situated at the highest level. The entire lower flange 96 including the front end 96a is situated under the extension plane P1 of the rotation path of the top bridge 71.

The intermediate case 92 is formed in a tubular shape having an open top end and an open bottom end. The intermediate case 92 is situated rearward of the top bridge 71 and the upper end of the head pipe 14 in side view.

An intermediate-case front 92a configuring the front face of the intermediate case 92 extends along the rear face 14b of the head pipe 14. A lower end of the intermediate-case front 92a extends forward in approximately parallel.

Left and right sides 92b of the intermediate case 92 are formed to be inclined such that the distance between the sides 92b in the vehicle width direction is decreased gradually toward the rear ends of the sides 92b, and the rear ends of the sides 92b are connected to each other. In short, the rear ends of the sides 92b configure the rear face of the intermediate case 92.

A flange 97 is formed on the entire perimeter of the top face of the intermediate case 92. The flange 97 extends from the upper edge of the intermediate-case front 92a and the upper edges of the sides 92b toward the interior of the intermediate case 92. The inner perimeter of the flange 97 defines an opening 92c providing an upwardly open interior of the intermediate case 92.

The flange 97 and the opening 92c are inclined upwardly toward the front in side view. Specifically, the flange 97 and the opening 92c are inclined upwardly toward the front at a larger angle than the top bridge 71. Note that the inclination of the top bridge 71 is equal to the inclination of the extension plane P1.

The flange 97 is an element attachment portion to which the air-cleaner element 88 is mounted. The flange 97 is provided with a plurality of fixing holes 97a which are fitted over fasteners (not shown) for securing of the air-cleaner element 88.

Specifically, the flange 97 is formed in a trapezoidal shape. The trapezoidal shape is formed by a rear edge 97b, a front edge 97c and left and right side edges 97d, the rear edge 97b being shorter than the front edge 97c which is located on the forward side of the vehicle, the rear edge 97b and the front edge 97c being connected through the left and right side edges 97d.

Further, a plurality of fixing holes 98 is provided on the top face of the intermediate case 92, the fixing holes 98 being fitted over fasteners 101 (FIG. 3) for securing of the upper case 93 to the intermediate case 92.

An opening 92d is formed in the underside of the intermediate case 92. The opening 92d is defined by the lower edges of the intermediate-case front 92a and the sides 92b. The opening 92d communicates with the interior of the bottom half 90 through the opening 90e.

An upper flange 99 is formed on the entire perimeter of the lower edge of the intermediate case 92, and the upper flange 99 protrudes outward of the opening 92d. The upper flange 99 and the flange 97 have a function as a rib to improve the strength and stiffness of the intermediate case 92.

In order to join the intermediate case 92 to the bottom half 90, the upper flange 99 and the lower flange 96 of the bottom half 90 are fixed together by welding or the like after the upper flange 99 is placed face-to-face with the lower flange 96 of the bottom half 90 from above.

In the embodiment, the joint between the upper flange 99 and the lower flange 96 is located under the extension plane P1 of the rotation path of the top bridge 71. As a result, the forward-protruding joint between the upper flange 99 and the lower flange 96 is prevented from coming into contact with the top bridge when the top bridge 71 is rotated. Because of this, the lower case 94 is able to be placed closer to the front side of the vehicle.

Figure 8:
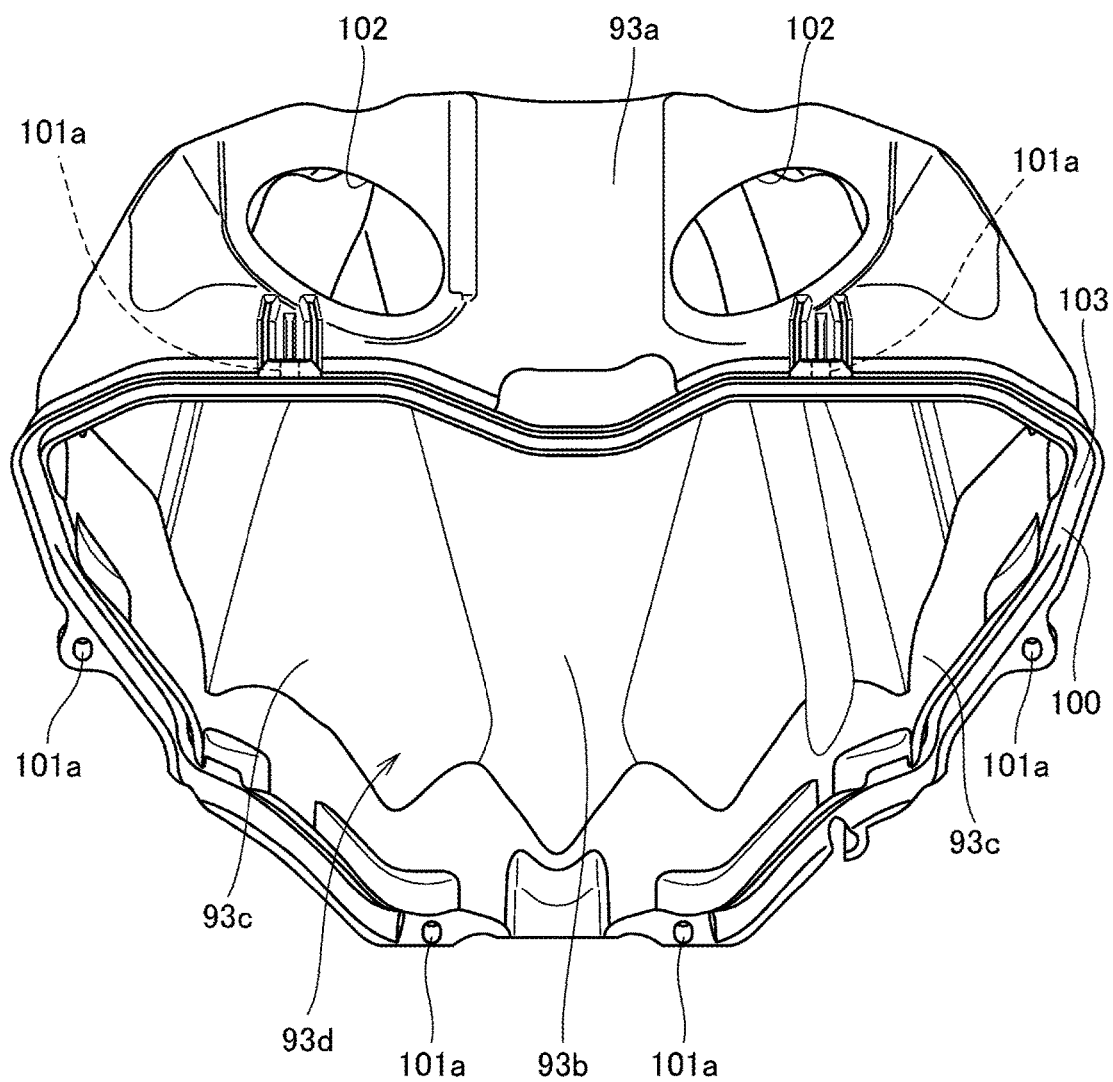
FIG. 8 is a view of an upper case as viewed from front.

FIG. 8 is a view of the upper case 93 as viewed from front.

The upper case 93 is formed in a box shape with an open underside. The upper case 93 has a lower portion situated rearward of the upper end of the head pipe 14, and has an upper portion situated rearward of the handlebar post 74.

An upper-case front 93a configuring the front face of the upper case 93 is inclined rearward at a larger angle than the head pipe 14.

An upper-case rear 93b configuring the rear face of the upper case 93 is inclined rearward along the bottom-half rear 90b.

Left and right sides 93c of the upper case 93 are formed to be inclined such that the distance between the sides 93c in the vehicle width direction is decreased taperingly toward the rear ends of the sides 93c.

The upper portions of the respective upper-case front 93a, upper-case rear 93b and sides 93c constitute the top face of the upper case 93.

Duct fixing holes 102 are formed respectively on the left and right sides of the upper-case front 93a of the upper case 93, the suction ducts 87 being inserted into and fixed in the duct fixing holes 102.

An opening 93d is formed in the underside of the upper case 93. The opening 93d is defined by the bottom edges of the respective upper-case front 93a, upper-case rear 93b and sides 93c.

An upper-case flange 100 is formed on the entire perimeter of the bottom edge of the upper case 93, and the upper-case flange 100 protrudes outward of the opening 93d.

The opening 93d is inclined upward toward the front in side view. The upper-case flange 100 formed along the opening 93d is also inclined upward toward the front. The upper-case flange 100 is formed in a trapezoidal shape corresponding to the flange 97.

The upper-case flange 100 has a function as a rib to improve the strength and stiffness of the upper case 93.

The upper-case flange 100 is provided with a plurality of holes 101a into which the fasteners 101 (FIG. 3) are inserted.

The upper case 93 is secured to the intermediate case 92 with the fasteners 101 after the upper-case flange 100 is placed face-to-face with the flange 97 of the intermediate case 92 from above.

The mating surface between the upper-case flange 100 and the flange 97 is a dividing surface 103 along which the top half 91 is divided vertically into two. The dividing surface 103 is provided in a position crossing the extension plane P1 at the rear of the top bridge 71. Also, the dividing surface 103 is inclined upward toward the front at a larger angle than the top bridge 71.

For maintenance for the air-cleaner element 88 and/or the like, the upper case 93 is readily detached from the intermediate case 92 by removing the fasteners 101.

In the embodiment, the dividing surface 103 of the top half 91 is placed at an inclination in the upward and forward direction, and this dividing surface 103 is also placed to cross the extension plane P1 of the rotation path of the top bridge 71, so that a front portion of the dividing surface 103 (the upper-case flange 100) protruding forward is situated upward of the top bridge 71. This enables ensuring of a clearance between the front portion of the dividing surface 103 and the top bridge 71. Thus, the air-cleaner case 41 is able to be placed closer to the front side of the vehicle. As a result, an increased distance between the air-cleaner case 41 and the seat 13 is provided to ensure plenty of room for the occupant.

Further, the dividing surface 103 is inclined upwardly toward the front at such a large angle that an extension line (not shown) extended directly from the dividing surface 103 toward the forward and upward direction passes through above the upper end of the top bridge 71. Thus, the large area of the air-cleaner element 88 in the up-down direction is able to be ensured, and also the vehicle-longitudinal space occupied by the air-cleaner element 88 is able to be reduced. Because of this, not only the air-cleaner element 88 is upsized, but also the air-cleaner case 41 is made smaller in size in the front-rear direction.

Figure 9:
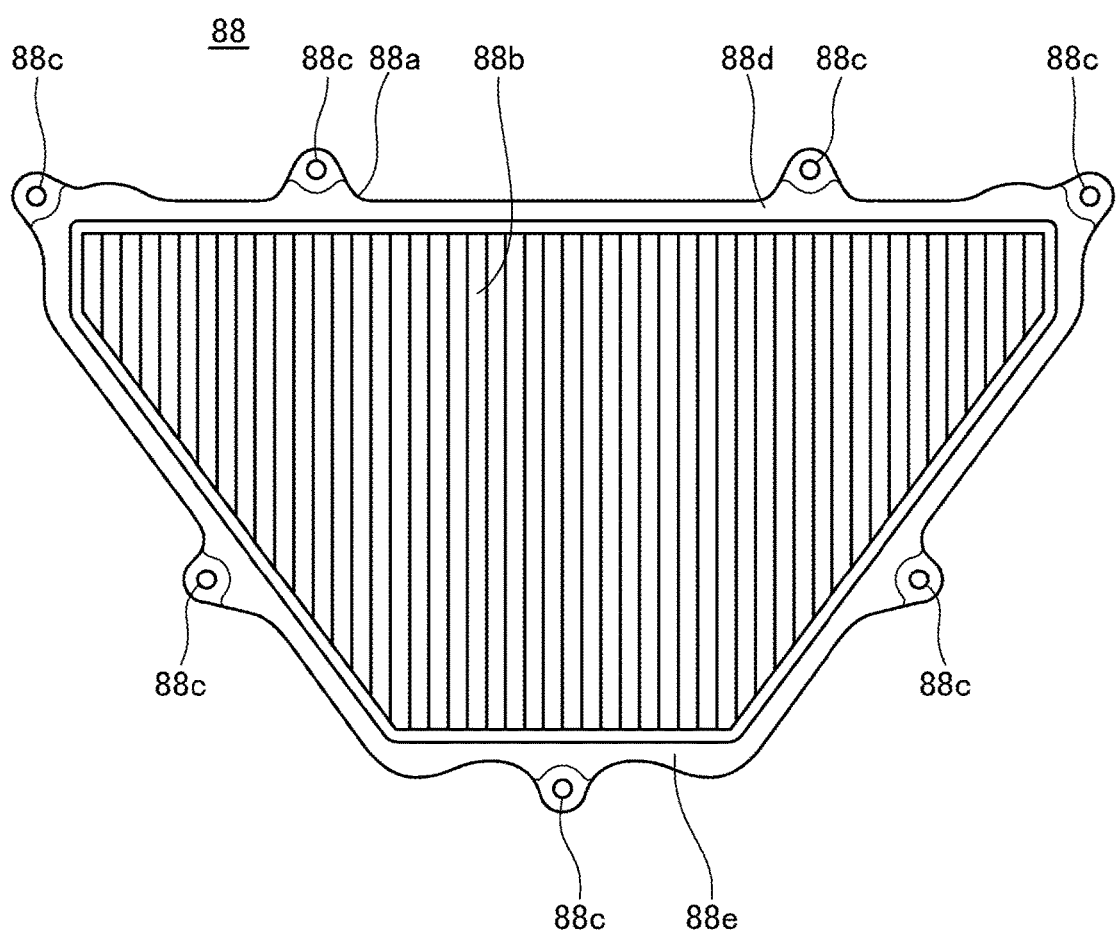
FIG. 9 is a top view of an air-cleaner element.

FIG. 9 is a top view of the air-cleaner element 88.

Referring to FIG. 5 to FIG. 9, the air-cleaner element 88 is formed in a plate shape and is arranged between the upper case 93 and the intermediate case 92.

Specifically, the air-cleaner element 88 is set on the flange 97 of the intermediate case 92, and then is secured to the flange 97 with the fasteners (not shown) fitted into the fixing holes 97a. That is, the air-cleaner element 88 is arranged in a position inclined upwardly toward the front along the dividing surface 103 of the top half 91 in side view.

By providing the air-cleaner element 88, the interior of the air-cleaner case 41 is partitioned into two, a clean side 105 above the air-cleaner element 88 and a dirty side 106 below the air-cleaner element 88.

The clean side 105 is a space for air to flow after the air has been drawn into the top half 91 through the suction ducts 87 and before the air passes through the air-cleaner element 88. The dirty side 106 is a space for the air to flow inside the lower case 94 after the air has been cleaned by passing through the air-cleaner element 88.

In the embodiment, because the air-cleaner element 88 is placed in a position tilting upward toward the front along the dividing surface 103 of the top half 91, the air-cleaner element 88 is ensured to have the large area in the up-down direction, and also the space occupied by the air-cleaner element 88 is reduced in the front-rear direction. Because of this, not only the area of the air-cleaner element 88 is increased, but also the air-cleaner case 41 is made smaller in size in the front-rear direction. Further, because the dividing surface 103 is located upward of the pair of left and right reinforcing frames 15b, the reinforcing frames 15b are out of the way of easy access to the air-cleaner element 88. As a result, maintainability is enhanced. In particular, in the embodiment, because the air-cleaner element 88 is inclined upward toward the front at a larger angle than the top bridge 71, not only the area of the air-cleaner element 88 can be increased in the up-down direction, but also the air-cleaner case 41 can be made smaller in size in the front-rear direction. Upsizing of the air-cleaner element 88 makes it possible to increase the life-span of the air-cleaner element 88. As a result, the cycle of maintenance can be lengthened.

The air in the clean side 105 flows through the connection tube 85 toward the intake port 36a. In the embodiment, an intake inlet 85a is provided on the top face of the connection tube 85. The intake inlet 85a is inclined upward toward the front along the inclination of the air-cleaner element 88. This makes it possible to not only downsize the connection tube 85, but also achieve an efficient flow of intake air.

The air-cleaner element 88 includes a frame 88a and a filter 88b, the frame 88a being secured to the flange 97, the filter 88b being supported on the inner sides of the frame 88a. In order to secure the air-cleaner element 88, the aforementioned fasteners fitted into the fixing holes 97a are inserted into fixing holes 88c of the frame 88a.

The air-cleaner element 88 is formed in a trapezoidal shape in top view to correspond to the shape of the flange 97 of the intermediate case 92. A front edge 88d of the air-cleaner element 88 is secured to the front edge 97c of the flange 97. That is, the air-cleaner element 88 is formed in a trapezoidal shape with the front edge 88d (the front side) being longer in the vehicle width direction than that of a rear edge 88e (the rear side) of the air-cleaner element 88. Because of this, the air-cleaner case 41 accommodating the air-cleaner element 88 can be also formed to have a shortened rear side located closer to the rider sitting on the seat 13. As a result, plenty of room for the rider can be ensured.

FIG. 10 is a sectional view taken along line IX-IX of FIG. 3.

Referring to FIGS. 3 to 5 and FIG. 10, the suction ducts 87 are respectively drawn forward from the duct fixing holes 102 formed in the upper portion of the upper case 93, such that intake inlets at the leading ends of the suction ducts 87 are oriented outward in the vehicle width direction and also oriented in the forward and downward direction.

The suction ducts 87 are located rearward of the top bridge 71 and the handlebar post 74, and located downward of the extension plane P2 of the rotation path of the handlebar central portion 73a and also upward of the extension plane P1 of the rotation path of the top bridge 71.

In this manner, the handlebar 73 is raised by the handlebar post 74 and the suction ducts 87 are provided between the extension plane P2 and the extension plane P1. This enables to make effective use of the space between the handlebar 73 and the top bridge to place the suction ducts 87. Further, because the intake inlets of the suction ducts 87 are located upward of the top bridge 71, this makes it difficult for dust and/or the like to reach the suction ducts 87 from the road surface. As a result, the fouling of the air-cleaner element 88 can be inhibited.

The upper case 93 includes a sensor fixing portion 107. The sensor fixing portion 107 is formed on the upper portion of the upper-case rear 93b to be recessed toward the interior of the upper case 93. The intake-air sensor 89 is secured to the sensor fixing portion 107. The intake-air sensor 89 is placed between the left and right suction ducts 87, and also the intake-air sensor 89 is situated rearward of the positions of the suction ducts 87 on the outer side of the upper case 93.

The intake-air sensor 89 includes a rod-shaped sensor body 89a and a connection 89b. The sensor body 89a is inserted into the upper case 93 to detect a temperature of the air in the clean side 105. The connection 89b is located within the sensor fixing portion 107 and wiring is connected to the connection 89b for transmission of detected values.

The sensor body 89a is inclined downward toward the front in approximately parallel to the upper case front 93a to extend toward the air-cleaner element 88. A lower end 89c serving as a detector is situated downward of downstream ends of the suction ducts 87 within the upper case 93.

In this manner, because the intake-air sensor 89 is arranged between the left and right suction ducts 87 within the upper case 93, the intake air in a large space between the left and right suction ducts 87 within the upper case 93, rather than within each suction duct 87, is able to be detected by the intake-air sensor 89. This leads to a higher degree of detection accuracy.

As shown in FIG. 4, the operating device 120 is located between the left and right suction ducts 87 as well as being located in the space surrounded with the suction ducts 87, the handlebar post 74 and the top bridge 71. Because of this, an effective use of the space between the left and right suction ducts 87 can be made for compact placement of the operating device 120. Further, the operating device 120 can be arranged in a location at the rear of the handlebar 73 to make it convenient for the rider to operate the operating device 120.

As shown in FIG. 4 and FIG. 10, steering clearance sections 108 are formed on the front face of the air-cleaner case 41, specifically, on the left and right ends of the intermediate-case front 92a and the bottom-half front 90a, in order to avoid the front forks 70 and the top bridge 71 during steering.

The steering clearance sections 108 are recessed rearward in a concave shape corresponding to the shapes of the front forks 70 and the top bridge 71. In this manner, by providing the steering clearance sections 108 in the front of the air-cleaner case 41, while the capacity of the air-cleaner case 41 is ensured, the air-cleaner case 41 is able to be placed closer to the front forks 70 to ensure plenty of room for the occupant at the rear of the air-cleaner case 41.

As so far described, according to the embodiment representing an example application of the present invention, the motorcycle 1 includes the air-cleaner case 41 arranged between the seat 13 and the head pipe 14 located forward of the seat 13. The air-cleaner case 41 includes the bottom half 90 and the top half 91. The bottom half 90 is arranged in the space surrounded with the rear face 14b of the head pipe 14 and the pair of left and right main frames 15 extending from the head pipe 14 toward the rear of the vehicle. The top half 91 is located above the main frames 15. The top half 91 is formed in the vertical two division structure. The dividing surface 103 of the vertical two division structure of the top half 91 is inclined in the vehicle-longitudinal direction, and the air-cleaner element 88 is mounted along the inclined dividing surface 103. Therefore, because the air-cleaner element 88 is mounted to the vehicle-longitudinally-inclined dividing surface 103 of the top half 91, the air-cleaner element 88 is ensured to have the large area in the up-down direction, and also the space to be occupied by the air-cleaner element 88 is able to be reduced in the front-rear direction. Thus, it is possible to achieve not only an increase of the area of the air-cleaner element 88 but also downsizing of the air-cleaner case 41. Further, because the dividing surface 103 is situated upward of the pair of left and right main frames 15, easy access to the air-cleaner element 88 is enabled. As a result, maintainability can be enhanced.

Further, the top bridge 71 is provided to support the front forks 70 in a position above the head pipe 14. The bottom half 90 is placed downward of the extension plane P1 of the rotation path of the top bridge 71. Therefore, the joint between the bottom half 90 and the top half 91 is situated under the extension plane P1 of the rotation path of the top bridge 71. Thus, a clearance between the joint and the top bridge 71 can be ensured when the top bridge 71 is rotated. Further, the dividing surface 103 of the top half 91 is arranged to be inclined upward toward the front as well as to cross the extension plane P1 of the rotation path of the top bridge 71. This enables providing the clearance between the top bridge 71 and the front portion of the dividing surface 103 of the top half 91. As a result, the air-cleaner case 41 is able to be placed closer to the front side of the vehicle, so that an increased distance between the air-cleaner case 41 and the seat 13 is provided to ensure plenty of room for the occupant.

Further, the suction ducts 87 taking in outside air are provided in the front portion of the top half 91. The steering handlebar 73 is spaced apart from the top face 71c of the top bridge 71 by the handlebar post 74 arranged between the top face 71c of the top bridge 71 and the handlebar central portion 73a which is the lower end of the handlebar 73. The suction ducts 87 are arranged under the extension plane P2 of the rotation path of the handlebar central portion 73a and also arranged above the extension plane P1 of the rotation path of the top bridge 71. In this way, the handlebar 73 is placed upward by the handlebar post 74, thereby ensuring the space between the handlebar 73 and the top bridge 71. Efficient arrangement of the suction ducts 87 is achieved while the clearance between handlebar 73 and the top bridge 71 is ensured.

Further, the suction ducts 87 are provided as a pair at the right and left. The operating device 120 is arranged between the left and right suction ducts 87 and also arranged in a space surrounded with the suction dusts 87 and the handlebar post 74. In this way, the space surrounded with the suction ducts 87 and the handlebar post 74 is effectively used for compact placement of the operating device 120. Further, there is little obstruction by the operating device 120, so that the suction ducts 87 can be provided in adequate length.

Further, the intake-air sensor 89 is placed between the suction ducts 87 within the air-cleaner case 41. Therefore, the intake-air sensor 89 is capable of detecting the intake air in a large space between the left and right suction ducts 87 in the interior of the air-cleaner case 41. As a result, detection accuracy can be enhanced.

Further, the air-cleaner element 88 is formed in a trapezoidal shape with the longer front edge 88d located on the vehicle front side in side view, so that the side-to-side length of the rear portion of the air-cleaner element 88 is shortened, making the rear portion of the air-cleaner case 41 compact. As a result, plenty of room for the occupant can be ensured at the rear of the air-cleaner case 41.

Further, the top bridge supports the front forks 70 in the condition that the upper ends of the front forks 70 protrude beyond the top bridge 71, so that the top bridge 71 is located at a lower level. This eliminates the necessity to reduce the size of the upper portion of the air-cleaner case 41 in order to provide a clearance for the top bridge 71. Because of this, the capacity of the upper portion of the air-cleaner case 41 can be ensured.

Further, the steering clearance sections 108 are formed on the intermediate-case front 92a and the bottom-half front 90a on the vehicle-front side of the air-cleaner case 41 in order to avoid the front forks 70 during steering. Because of this, the air-cleaner case 41 is able to be placed closer to the front forks 70 to ensure plenty of room for the occupant at the rear of the air-cleaner case 41.

Further, the fuel tank 57 is placed under the seat 13. The straddling section 56 depressed more downward than the seat 13 is provided in front of the seat 13. The fuel filler hole 57a of the fuel tank 57 is exposed from the filler-hole lid 44a which is provided on the side of the straddling-section-56 of the seat 13. A space created by placing the air-cleaner case 41 at the rear of the top bridge 71 is used to provide the straddling section 56 in front of the seat 13. The fuel tank 57 can be readily supplied with fuel through the fuel filler hole 57a which is exposed from the filler-hole lid 44a, the filler-hole lid 44a being provided on the straddling-section-56 side of the seat 13.

Further, the dividing surface 103 of the top half 91 is arranged to be inclined upward toward the front along a line passing through above the upper end of the top bridge 71 in side view. Thus, the air-cleaner element 88 is ensured to have the large area in the up-down direction, and also a reduction in the vehicle-longitudinal space occupied by the air-cleaner element 88 is achieved. Because of this, not only the air-cleaner element 88 is upsized, but also the air-cleaner case 41 is made smaller in size in the front-rear direction.

It should be understood that the above-described embodiment represents an aspect of applications of the present invention, and the present invention is not limited to the embodiment.

Although the embodiment has been described by using the motorcycle 1 as an example of the saddle-ride type vehicle, the present invention is not limited to this. The present invention may be applied to, for example, a three-wheeled saddle-ride type vehicle having either two front wheels or two rear wheels, or a saddle-ride type vehicle having four or more wheels.

REFERENCE SIGNS LIST

1 . . . Motorcycle (Saddle-ride type vehicle)
13 . . . Seat (occupant seat)
14 . . . Head pipe
14b . . . Rear face
15 . . . Main frames (Frame members)
41 . . . Air-cleaner case
44a . . . Filler-hole lid (Lid)
56 . . . Straddling section
57 . . . Fuel tank
57a . . . Fuel filler hole
70 . . . Front forks
71 . . . Top bridge
71c . . . Top face
73 . . . Handlebar
73a . . . Handlebar central portion (Lower end of the handlebar)
74 . . . Handlebar post
87 . . . Suction ducts
88 . . . Air-cleaner element
89 . . . Intake-air sensor
90 . . . Bottom half
91 . . . Top half 103 . . . Dividing surface
108 . . . Steering clearance sections
120 . . . Operating device (Handlebar locking device)
P1 . . . Extension plane (Extension plane of the rotation path of the top bridge)
P2 . . . Extension plane (Extension plane of the rotation path of the lower end of the handlebar)

The invention claimed is:

1. An air-cleaner structure of a saddle-ride type vehicle, comprising an air-cleaner case placed between an occupant seat and a head pipe located forward of the occupant seat, wherein
the air-cleaner case includes a bottom half and a top half, the bottom half being disposed in a space surrounded by a rear face of the head pipe and a pair of left and right frame members extending from the head pipe toward a rear of the saddle-ride type vehicle, the top half being situated above the frame members,
the top half is formed in a vertical two division structure, the vertical two division structure of the top half having a dividing surface inclined in a longitudinal direction of the saddle-ride type vehicle,
the top half is provided with an intermediate case joined to the bottom half and an upper case attached to a top face of the intermediate case, an opening is formed in an underside of the upper case, an upper-case flange protruding outward of the opening is formed at a bottom edge of the upper case, and a mating surface between the upper-case flange and the intermediate case is the dividing surface along which the top half is divided vertically into two,
an air-cleaner element is mounted along the dividing surface,
the dividing surface is inclined upwardly toward a front of the saddle-ride type vehicle at a larger angle than an inclination of an extension plane of a rotation path of a top bridge of the saddle-ride type vehicle supporting a front fork in a position above the head pipe, the dividing surface is arranged to cross the extension plane, and a front end of the upper-case flange is situated upward of the top bridge to provide a clearance in an up-down direction of the saddle-ride type vehicle between the front end of the upper-case flange and the top bridge,
the upper-case flange of the top half is formed in a trapezoidal shape with a long side on a front side of the saddle-ride type vehicle in top view,
the air-cleaner element includes a frame and a filter supported on inner sides of the frame, and
the frame is formed in a trapezoidal shape with a long side on the front side in top view corresponding to the trapezoidal shape of the upper-case flange of the top half.

2. The air-cleaner structure of the saddle-ride type vehicle according to claim 1, further comprising
a suction duct provided in a front portion of the top half to take in outside air,
wherein the saddle-ride type vehicle includes a handlebar for steering operation,
the handlebar is spaced apart from a top face of the top bridge by a handlebar post, the handlebar post being placed between a lower end of the handlebar and the top face of the top bridge, and
the suction duct is placed under an extension plane of a rotation path of the lower end of the handlebar and the top face of the top bridge.

3. The air-cleaner structure of the saddle-ride type vehicle according to claim 2,
wherein the suction duct is provided as a pair of left and right suction ducts, and
the saddle-ride type vehicle includes a handlebar locking device arranged between the left and right suction ducts and also arranged in a space surrounded by the left and right suction ducts and the handlebar post.

4. The air-cleaner structure of the saddle-ride type vehicle according to claim 3, further comprising an intake-air sensor arranged between the left and right suction ducts in the interior of the air-cleaner case.

5. The air-cleaner structure of the saddle-ride type vehicle according to claim 1, wherein the top bridge supports the front fork in a condition that an upper end of the front fork protrudes beyond the top bridge.

6. The air-cleaner structure of the saddle-ride type vehicle according to claim 1, wherein the saddle-ride type vehicle includes a steering clearance section formed on the front side of the air-cleaner case in order to avoid the front fork during steering.

7. The air-cleaner structure of the saddle-ride type vehicle according to claim 1, wherein the saddle-ride type vehicle includes:
a fuel tank arranged under the occupant seat; and
a straddling section provided in front of the occupant seat to be depressed more downward than the occupant seat,
wherein the fuel tank has a fuel filler hole exposed from a lid, the lid being provided on a side of the straddling-section of the occupant seat.

8. The air-cleaner structure of the saddle-ride type vehicle according to claim 1, wherein the dividing surface of the top half is formed to be inclined upward toward the front along a line passing through above an upper end of the top bridge in side view.

* * * * *